Aug. 2, 1955   J. H. NORMAN ET AL   2,714,318
COMBINED DRILL, TAP, AND LIVE-CENTER
CHUCK ADAPTER OR THE LIKE
Filed Nov. 7, 1952   2 Sheets-Sheet 1

Inventors,
John H. Norman and
William J. Anderson
By: Jones, Tesch and Darbo Attys.

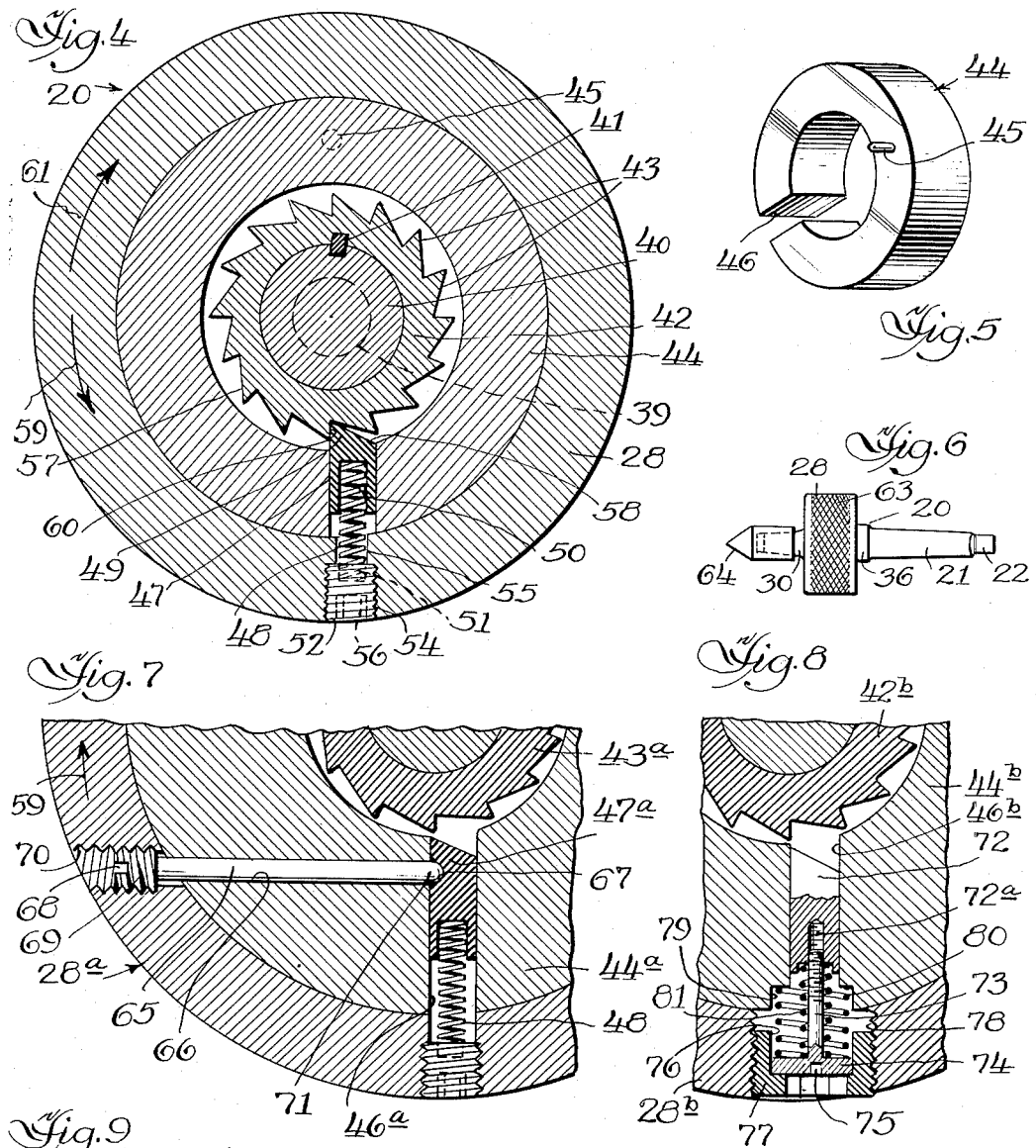

United States Patent Office 2,714,318
Patented Aug. 2, 1955

2,714,318

COMBINED DRILL, TAP, AND LIVE-CENTER CHUCK ADAPTER OR THE LIKE

John H. Norman and William J. Anderson, Elmhurst, Ill., assignors to Howard H. Darbo, Wheaton, Ill.

Application November 7, 1952, Serial No. 319,278

12 Claims. (Cl. 77—60)

This invention relates to a combined drill, tap and live-center chuck adapter or the like for a machine tool such as a lathe.

Among other objects the invention aims to provide an improved adapter of the class described which makes possible greater accuracy of performance of the machine tool and enhanced speed and facility of operation.

One important object of the invention is the provision of a chuck adapter which can be rotated to a new relative location rotatively to change the position of the cutting edges of a drill or reamer with respect to the rotating work at any time during the drilling or reaming operation without winding the drill out of the work hole, and for the purpose of drilling or reaming small holes to a much closer tolerance in direction and concentricity than has heretofore been feasible.

Another object is the provision by which the same device may be used as a live-center adapter for a lathe.

The invention still further provides without change of parts a chuck adapter that can be used for tapping small holes true, with lathe spindle, by rotating the adapter by hand, thus reducing leverage and holding the tap concentric so as to minimize risk of breakage.

These and other objects and advantages will be apparent from the following description, taken together with the accompanying drawing, in which—

Figure 4 is a cross-section, on the scale of Fig. 3, and taken on the line 4—4 of the latter;

Figure 5 is a reduced perspective view, approximately on the scale of Fig. 2, of the ratchet cage shown in Figs. 3 and 4;

Figure 6 is a still further reduced view, approximately on the scale of Fig. 1, showing a live center employed with the device;

Figure 7 is a fragmentary section similar to Fig. 4 but showing an embodiment of the invention including one form of pawl disengaging means;

Figure 8 is a view somewhat similar to Fig. 7 but showing an alternative form of pawl disengaging means;

Figure 9 is a somewhat diagrammatic view, on an enlarged scale, of the effect of a conventional drilling operation with the usual imperfection in the tool; and Figure 10 is a similar view showing how the effect of such imperfection may be eliminated or reduced by use of the present invention.

Figure 1:
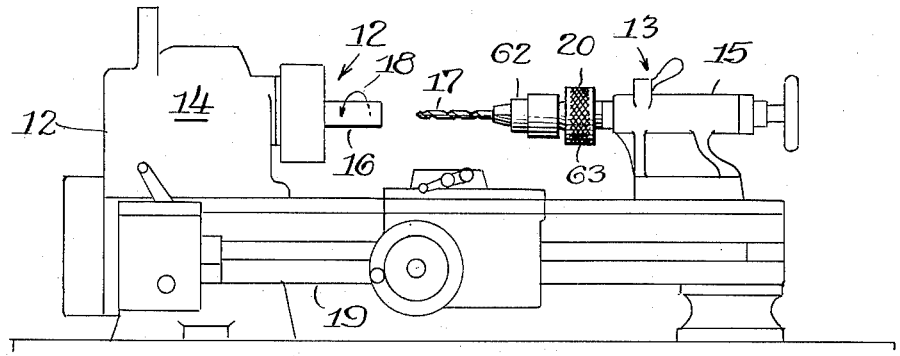
Figure 1 is a general view of a machine tool with which the present invention may be advantageously associated.
Figure 2:
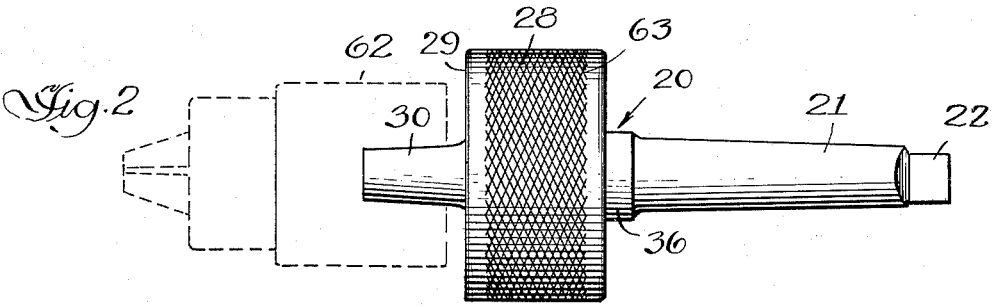
Figure 2 is an enlarged side view of the device of the present invention showing in broken lines a conventional chuck connected thereto.
Figure 3:
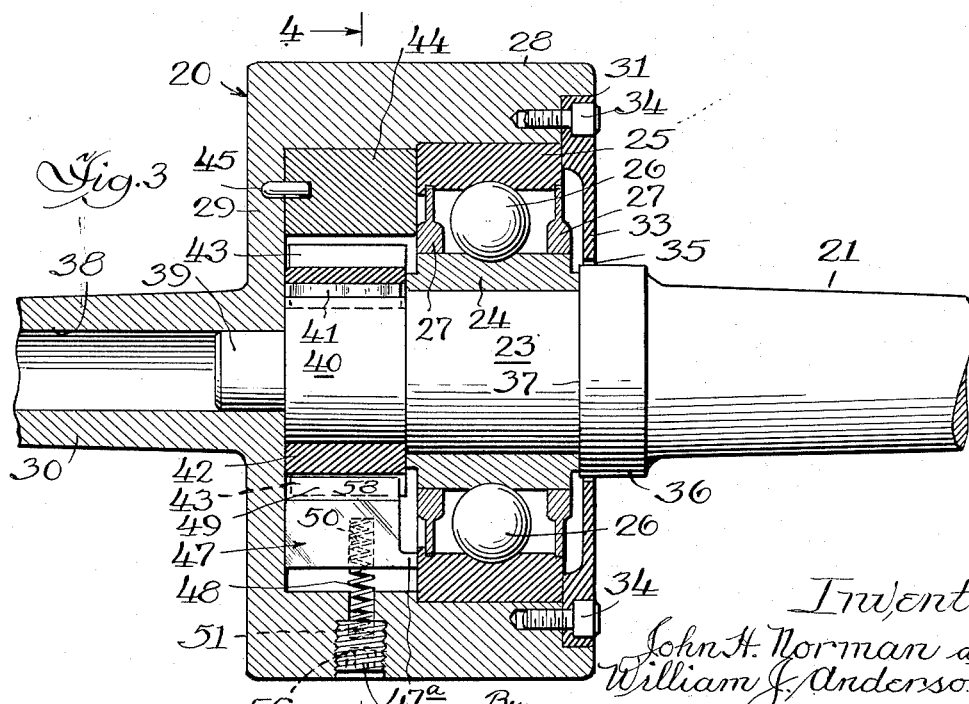
Figure 3 is a still further enlarged view, in axial section, of operative parts of the device.

Referring to the drawings, there is shown in Fig. 1 an illustrative lathe which may be used also as drill press or tapping tool, the elements of which, since they form no part of the present invention, need not be specifically described except to indicate by the numeral 12 the headstock of the apparatus and by the numeral 13 the tailstock. In the present illustration the headstock, with the work chucked thereon, may be rotated by a motor mechanism 14 while the tailstock is held stationary upon the lathe bed 19 by elements indicated generally by the numeral 15. It may be assumed, for purposes of present description, that a piece of work such as 16 is to be centrally bored by a drill 17 carried by the tailstock, the work 16 being rotated in the direction of the arrow 18 while the drill is held from rotation but moved progressively toward the work by means of the hand wheel on the tailstock in the usual manner.

In order to enhance the trueness of the hole or bore, to be drilled in the work 16 in this instance, the drill 17 is shown carried, in accordance with the present invention, by the adapter device 20 embodying the invention hereof, the structure and function of which will be next described in detail and by reference first to Figs. 2 to 5 inclusive.

In accordance with the present invention, the device 20 includes a shank 21 having the usual tang 22 and adapted to be inserted in the socket of the tailstock of the lathe, for which purpose it has the usual so-called Morse taper.

On the reduced journal portion 23 of the shank 21 is mounted anti-friction bearing means comprising as here shown an inner ball race 24 and an outer ball race 25, with hardened steel balls 26 therebetween and the usual retaining rings 27 therefor, it being understood that the outer race ring 25 can thus rotate substantially anti-frictionally with respect to the inner race 24 and shank 21.

On the outer race ring 25 is mounted a cylindrical cupped housing 28 that at its distal end has a radial wall 29 merging into a centrally reduced spindle-like chuck mounting portion 30, and at its other or proximal end is initially open at 31 to be passed over the ball-bearing device, this proximal end being then closed by a keeper plate 33 secured as by screw-bolts 34 to the housing and bearing against the outer race ring 25 to hold the housing and race ring in assembly. The keeper plate 33 is centrally appertured as at 35 to turn without contact on the hub 36 of the shank 21. At the same time the inner race ring 24 of the ball-bearing is drawn up to the shoulder 37 on the shank hub by the housing and parts contained therein next described.

Further in accordance with the present invention, the chuck mounting portion 30 of the housing 28 is axially bored as at 38 to provide for the reduced termination 39 of the shank 21, and, within the housing and between the termination 39 and the hub 23, the shank has an intermedially reduced portion 40 upon which is fixed as by a key 41 a ratchet wheel 42 having the usual teeth 43. The housing portion 30 provides a bearing for the shank journal termination 39.

Between the ratchet wheel 42 and the housing 28 is a somewhat cylindrical ratchet cage 44 fixed by any suitable means such as one or more pins 45 to rotate with the housing and relatively to the ratchet wheel and shank. The cage 44 snugly fills the space axially between the housing radial wall 29 and the ball-bearing outer race 25, while the ratchet member 42 somewhat similarly snugly fills the space axially between the housing radial wall 29 and the ball-bearing inner race 24. It will be understood, however, that the latter fit is such as to permit relative rotation between the housing with its elements 29 and 30, on the one hand, and the ratchet wheel 42 and ball-bearing inner race 24 on the other.

Following the present invention, the ratchet cage 44, as best seen in Figs. 4 and 5 is not a complete cylinder but is broken away as at 46 to provide a slot in which plays a pawl 47 that is pressed in this instance by a compression coil spring 48 so that its nose 49 is held yieldingly in engagement with the teeth 43 of the ratchet. For this purpose the spring 48 has one end pressing into a cylindrical cavity 50 in the pawl 47 and its other end butted in a similar cavity 51 in an adjustable set-screw 52 that is threadedly received in a tapped counterbore 54 of a passage 55 through the housing 28 and registering with the slot 46 in the ratchet cage. The set-screw 52 may have a socket head for the reception, as at 56, of an Allen wrench for adjusting the pressure of the spring 48 on the pawl 47. The pawl 47 has a projection 47a by which it slidingly contacts the outer race 25 while being free of the inner race 24, the pawl being thus arranged for sliding radial movement in the slot 46.

It will be understood that by reason of the triangular shape of the teeth 43 of the ratchet and of the nose 49 of the pawl, which provide cam surfaces such as at 57 on the ratchet and at 58 on the pawl nose respectively, the housing, ratchet cage, and pawl are permitted to rotate, upon the application of the sufficient torque to compress the spring 48, in the direction of the arrow 59 (Fig. 4), while, by reason of the abutting radial interface 60 between the ratchet teeth and the pawl, the housing, ratchet cage, and pawl are held against rotation in the direction of the arrow 61 with respect to the ratchet, or in other words, so that the drill 17 will not rotate with the work 16 in the direction of the arrow 18, but can be rotated in the opposite direction.

To mount the drill 17 on the housing 28 of the adapter of the present invention, a conventional drill chuck such as 62 may be employed, which has the usual tapered socket receiving the tapered chuck-mounting element 30 of the housing. The drill 17 is then chucked in the chuck 62 as is customary.

It usually happens, since it is difficult if not impossible to prevent it, that the cutting edges of a drill such as 17 may not be at exactly equal distances from the center line or axis of the drill in a given cross-sectional plane through the drill, and, in such case, there is a tendency for the hole bored by the drill to go off at an angle or to not remain perfectly concentric with the work.

For example, as shown diagrammatically in Fig. 9, assuming that the true center of the work is at w but that the distance from w to cutting lip A is slightly greater than the distance from w to cutting lip B. Theoretically the circle cut by A would still be as at x, i. e. concentric with the work. However, in normal operation, with the work rotating in the direction of the arrow 18 and the drill held from rotating, the drill will tend to seek a new center of its own, or the virtual center v, equidistant from the cutting lips A and B. This will tend to cut a new circle y which is not concentric or true with the work circle x. If now, however, it be possible to arcuately rotate the drill at intervals, as, for example, in the direction of the arrow 59, while the work is still rotating in the direction of the arrow 18 and say, to place the cutting lip A, for example at the new position shown in full lines in Fig. 10, or ninety degrees from its position in Fig. 9, this absolute rotation of the drill, with the work still rotating, tends to offset and counteract the tendency of the drill to seek its virtual center v and tends to cause the longer cutting lip A to continue to rotate about the true center w and thus to continue to cut the true circle x rather than the eccentric circle y, while the cutting lip B will continue to describe the smaller circle z, which also is still concentric with the work center w. Occasional and periodic rotations of the drill in the direction of the arrow 59, by arcuate rotation less than 360°, and for example ninety degrees at a time, say, next to the position shown in dotted lines in Fig. 10, enhances the action of the drill in adhering to the circle x, i. e. a circle concentric with the true center of the work. Such intermittent partial rotation of the drill may desirably be accomplished by manually grasping the knurled periphery 63 of the housing 28 and turning the housing in the direction of the arrow 59, which is permitted by the pawl and ratchet arrangement already described.

In another desirable utility for the device of the present invention, means are provided for inactivating the pawl of the ratchet so that the adapter may be used, if desired, as a so-called live-center support for either a male or a female "live-center."

As suggested in Figs. 6 and 7, with the pawl 47a inactivated, the conical member 64 (Fig. 6) may be located on the part 30 of the adapter device 20 in lieu of the chuck previously described. Fig. 7 shows one expedient for inactivating the pawl 47a. Here the rod 65 passes through a passage 66 in the ratchet cage 44a transverse to and intersecting the slot 46a for the pawl, and the pawl has a depression 67 in its side face which receives the point of the detent rod 65 when the rod is screwed into the passage 66 by means of a screw-driver placed in the kerf 68 of the head 69 of the rod, which latter is threadedly received in a tapped counterbore 70 of the passage 66 and opening through the periphery of the housing 28a. To retract the pawl 47a to receive the rod 65 in its recess 67, the housing 28a may be rotated in the direction of the arrow 59 until the triangular point at the nose of the pawl rides onto the triangular point at the outer end of one of the ratchet teeth 43a. The rounded point 71 of the detent rod 65 can then be partially screwed into the similarly rounded recess 67 and thereafter continued inwardly directed movement, by further screwing inwardly of the rod 65, will move the nose of the pawl completely out of the path of the ratchet teeth, as shown in Fig. 7 and will retain the pawl in that inactive position until the rod 65 is again backed off by a screw-driver to free the pawl from the influence of the detent and again permit it to act upon the ratchet teeth under the influence of the spring 48.

An alternative expedient for retracting the pawl is shown in the modification of Fig. 8. Here the pawl 72 is axially tapped as at 72a to receive the threaded stem 73 of a stud having a head 74 that is kerfed at 75 to receive a screw-driver blade. The stud head 74 plays in a recess 76 of appropriate diameter in a hollow screw 77 that in turn is threadedly received in the tapped opening 78 in the housing 28b. A recess 79 is formed in the ratchet cage 44b registering with the recess 76 and the slot 46b in the ratchet cage 44b, which two recesses 76 and 79 jointly receive a compression spring 80 which urges the head 74 of the stud to the outer end of the recess 76. When the stud is pressed inwardly against the spring 80, its threaded stem 73 may enter the tap 72a of the pawl, and consequent rotation of the stud by a screw-driver in a conventional inward screwing direction will retract the pawl, since the pawl cannot rotate and the stud is pressed outwardly by the spring 80. Thus the pawl will be held in the position shown in Fig. 8. When it is desired to release the pawl, the stud may be unscrewed to free it from the pawl and thereupon the coil spring 81, which is nested within the spring 80 and about the steel stem, will come into play and will urge the pawl into engagement with the ratchet wheel 42b.

Still another useful function of the adapter device of the present invention is for tapping small holes. With the pawl retracted as shown in Fig. 7, for example, and a conventional tapping tool carried by a tap chuck mounted on the chuck receiving portion of the housing, the housing 28a may be rotated by hand by small increments or the work piece may be rotated while the housing 28a is manually restrained from rotation. This makes possible accurate and breakage-free tapping work by limiting the torque applied to the tool and maintaining the tap truly concentric.

The invention is not intended to be limited to details of construction shown for purposes of exemplification. Furthermore, it may not be desirable invariably to embody all of the features thereof conjointly, as various combinations and subcombinations may at times be advantageously employed.

Such changes may be made as fall within the scope of the appended claims without departing from the invention.

What is here claimed is:

1. A combined drill, tap and live center chuck adapter or the like, comprising a shank, an anti-friction bearing on the shank, a housing rotatable with respect to the shank on said bearing, means inhibiting relative axial movement of the housing and shank, a ratchet wheel on the shank within the housing, a pawl carried by and within the housing engageable with the ratchet, said ratchet and pawl inhibiting relative rotative movement of the housing and shank in one direction and permitting such relative rotative movement in the other direction, means biasing said pawl and ratchet into engagement, and means for inactivating said biasing means and for holding the pawl out of engagement with the ratchet to permit free rotation of the housing on the shank, the last mentioned means including means accessible on the exterior of the housing.

2. The structure of claim 1 wherein said last mentioned means includes a detent rod passing through the housing transversely to the pawl, the pawl having a recess receiving the end of the detent rod when the pawl is retracted, the detent rod having an outer end threaded into a passage in the housing therefor for adjustment thereof toward and away from the pawl.

3. The structure of claim 1 wherein said last mentioned means includes a stud having an enlarged head and a threaded stem aligned with the pawl, the pawl having a threaded recess to receive the stem and there is a coil spring surrounding the stem and urging the pawl and stud apart to cause the pawl to engage the ratchet when not retracted by the stud, there being another spring urging the stud to the outer end of a recess receiving the head of the stud, said recess being in a hollow set-screw in the wall of the housing.

4. A combined drill, tap and live center chuck adapter or the like, comprising, a shank, an anti-friction bearing on the shank, a housing rotatable with respect to the shank on said bearing, a ratchet wheel on the shank within the housing, a pawl carried by and within the housing engageable with the ratchet, said ratchet and pawl inhibiting relative rotative movement of the housing and shank in one direction and permitting such relative rotative movement in the other direction, biasing means urging said pawl and ratchet into engagement, means for inactivating said biasing means and for holding the pawl out of engagement with the ratchet to permit free rotation of the housing on the shank, and means on the housing for carrying a live center, tap, or drill chuck or the like.

5. A combined drill, tap and live center chuck adapter or the like, comprising, a shank, a housing on and rotatable with respect to the shank, means inhibiting relative axial movement of the housing and shank, a ratchet wheel on the shank within the housing, a pawl carried by and within the housing engageable with the ratchet, said ratchet and pawl inhibiting relative rotative movement in one direction and permitting such relative movement in the other direction, means biasing said pawl and ratchet into engagement, detent means for inactivating said biasing means and for holding the pawl to permit free rotation of the housing on the shank in either direction, and means on the housing for carrying a drill, tap or live center chuck.

6. In a chuck adapter or the like, a shank, an anti-friction bearing on the shank, a housing rotatable with respect to the shank on said bearing, means inhibiting relative axial movement of the housing and shank, a ratchet wheel on the shank within the housing, a ratchet wheel cage within the housing, a pawl carried by and within the housing engageable with the ratchet, said ratchet cage being slotted and said pawl being slidable in the slot in the cage, said ratchet and pawl inhibiting relative rotative movement of the housing and shank in one direction and permitting such relative movement in the other direction, means biasing said pawl and ratchet into engagement, and an adjustment for said biasing means.

7. In a chuck adapter or the like, a shank, an anti-friction bearing on the shank, a housing rotatable on and with respect to the shank on said bearing, a ratchet wheel on the shank within the housing, a pawl carried by and within the housing engageable with the ratchet wheel, said ratchet wheel and pawl inhibiting relative rotative movement of the housing and shank in one direction and permitting such relative movement in the other direction, means biasing said pawl and ratchet into engagement, and chuck receiving means on the housing.

8. The structure of claim 7 wherein the housing rests at one end on the outer race member of a ball bearing device and there is a keeper plate screwed to the housing holding the housing and said race member in longitudinal assembly, said keeper plate being free of the shaft, and wherein the other end of the housing is reduced to provide both a bearing for the end of the shaft and a chuck receiving portion of the housing.

9. The structure of claim 7 wherein the shank carries the ratchet wheel and the housing encloses a ratchet cage that has a slot therein receiving the pawl and permitting radial sliding movement of the pawl therein, and there is a compression coil spring compressed between the housing and the pawl biasing the pawl and ratchet into engagement.

10. The structure of claim 7 wherein the shank is tapered and terminates at one end in a tang, and wherein the housing has a hollow tapered part providing a bearing for the shank other end.

11. The structure of claim 7 wherein the periphery of the housing is knurled for manual rotation in a direction reverse to that from which it is inhibited.

12. In a chuck adapter for drilling work or the like, a shank, a housing rotatable with respect to the shank, means inhibiting relative axial movement of the bearing and chuck, interengaging means on the shank and housing inhibiting relative rotative movement of the housing and shank in one direction and permitting such relative rotative movement in the other direction, and means on the housing for carrying a drill chuck or the like, whereby the chuck may be manually rotated in the reverse direction from its relative rotative direction with respect to the work to enhance its precision of operation.

References Cited in the file of this patent

UNITED STATES PATENTS 994,581    Fay _____ June 6, 1911